March 4, 1958 P. KERSHMAN 2,825,418
MOTOR VEHICLE ACCELERATION SIGNAL DEVICE
Filed Oct. 17, 1955
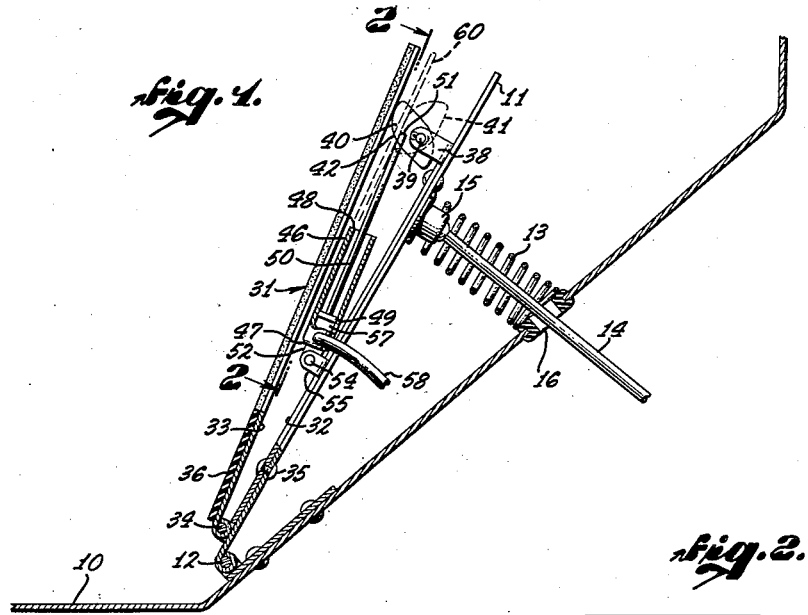
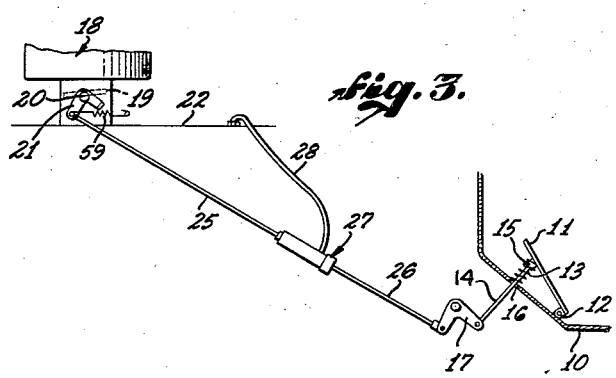
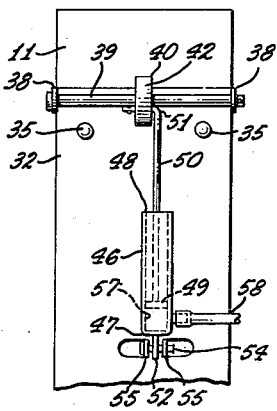
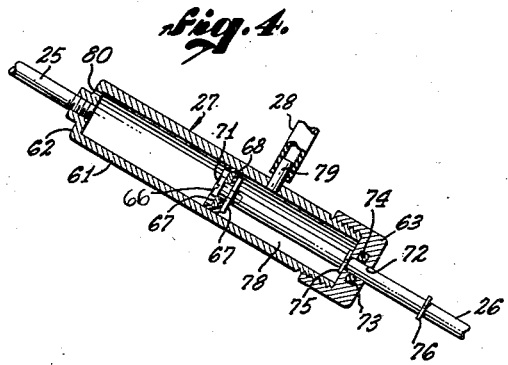
PHILIP KERSHMAN,
INVENTOR.
HUEBNER, BEEHLER
WORREL & HERZIG,
ATTORNEYS.

United States Patent Office
2,825,418
Patented Mar. 4, 1958

1

2,825,418

MOTOR VEHICLE ACCELERATION SIGNAL DEVICE

Philip Kershman, Los Angeles, Calif.

Application October 17, 1955, Serial No. 540,987

1 Claim. (Cl. 180—77)

This invention relates broadly to signal devices in motor vehicles and more particularly to devices for signalling a driver of a motor vehicle in instances where he is operating the accelerator of his vehicle improperly.

When the load on the motor of an automobile is increased as, for example, when the automobile is being driven up a grade, a driver will normally depress his accelerator foot pedal to maintain the speed of the automobile. It is usual, too, for the driver to depress the foot pedal quickly under these circumstances. During the interval of speed increase, the intake manifold suction decreases and a rapid depression of the foot pedal to increase the fuel supply results in uneconomical fuel consumption and inefficent operation of the automobile.

It is an object of this invention to provide a device which will affectively signal a driver in instances where he is depressing the accelerator of his vehicle too rapidly for efficient operation of the vehicle.

Another object of the invention is to provide a device of the above mentioned character which serves to absorb or dissipate much of the force which a driver may apply against the accelerator of his vehicle when attempting too quickly to increase the speed of the vehicle.

A further object of the invention is to provide an effective device of the above mentioned character which is simple in construction so that it may be manufactured for sale to the public at low cost and still further may be installed easily and quickly by a car owner.

Further objects and advantages of the invention will appear during the course of the following part of this specification, wherein the details of construction and mode of operation of two embodiments thereof are described with reference to the accompanying drawing, in which:

Figure 1 is a longitudinal section through a signalling device embodying the invention, the same being installed on a conventional accelerator foot pedal of a motor vehicle;

Figure 2 is a view of the signal device taken on line 2—2 of Figure 1;

Figure 3 is a diagrammatic view of a second embodiment of the invention, showing the same as it may be installed in a motor vehicle according to the present invention; and Figure 4 is a longitudinal section on an enlarged scale through the signalling device shown in Figure 3.

Referring now to the drawing in greater detail, reference is had first to Figure 3 for describing the conventional parts of an automobile, to which the devices of this invention are connected. Numeral 10 designates a floor board of an automobile on which a conventional accelerator foot pedal 11 is pivotally mounted as by hinge 12 so that the pedal may be depressed by the driver's foot to increase the speed of the automobile. A spring 13 positioned between the pedal and the floor board serves to swing the pedal upwardly from the floor board. A rod 14 is pivotally attached at one end 15 thereof to the underside of the foot pedal and extends through hole 16 of the floor board for connection to a bell crank 17. Reference numeral 18 designates a conventional carburetor having a throttle valve 19 mounted in the throat of the carburetor on a shaft 20. A lever 21 is fixed on one end of the shaft for effecting rotation of the shaft and the throttle valve. The intake manifold of the automobile motor is represented at 22.

In Figure 3 of the drawing, the lever 21 on the carburetor is linked to the bell crank 17 through two aligned rods 25 and 26. These rods are interconnected at their mutually adjacent ends through a device 27 embodying the present invention. A tube 28 connects the device 27 to the intake manifold 22.

For convenience of description herein, the details of construction of the device shown in Figure 1 will be described prior to describing the structure and mode of operation of the device shown in Figures 3 and 4. It is to be noted at this point, however, that for the embodiment shown in Figure 1 the rods 25 and 26 may constitute a single rod for linking the bell crank 17 directly to the lever 21, as will be more fully explained hereinafter.

Referring now to Figure 1 of the drawing, the signal device shown therein is designated generally by reference numeral 31. It comprises a lower plate 32 and an upper plate 33, which are hinged together at 34. The lower plate 32 is fixed flat on the upper surface of the foot pedal 11 as by rivets 35. When the device 31 is mounted as shown in Figure 1, the upper plate 33 serves as the foot pedal for accelerating the automobile and in its preferred form such upper plate has a sheet or pad 36 of rubber or the like covering its upper surface to provide a friction contact surface for the driver's shoe.

The lower plate 32 has two lugs 38 extending upwardly from the top surface thereof. A pin 39 extends between these lugs for pivotally supporting a cam 40 between the plates. The cam 40 is eccentric and is mounted to be turned on the axis of pin 39 between the full line position thereof shown in Figure 1 to the broken line position 41. When the cam is in its full line position its major axis is substantially perpendicular to the lower plate 32. The cam presents a curved surface 42 in contact with the underside of the upper plate 33.

Intermediate the cam 40 and the hinge 34 is a cylinder 46 which is closed at that end thereof proximate the hinge 34 by an end closure 47 and is open at its opposite end 48. A piston 49 is movable longitudinally in the cylinder and is linked to the cam through a piston rod 50 pivotally secured to the cam at its outer end 51. On the end closure 47 is a lug 52 by which the cylinder 46 is pivotally mounted through a pivot pin 54 and upstanding lugs 55 to the upper surface of the lower plate 32.

The end closure 47 and the piston 49 define a chamber 57 within the cylinder. A tube 58 passes through the wall of the cylinder into the chamber 57, and at its other end the tube is connected to the intake manifold of the automobile similarly as the tube 28 in the embodiment shown in Figure 3.

In operation, when the automobile is in motion the vacuum in the intake manifold will be at given pressure and such vacuum will be transmitted to the cylinder 46 through tube 58 to retain the piston 49 proximate the end closure 47 of the cylinder whereby the cam 40 will be disposed in its full line position to spread the plates 32 and 33 apart. When next the load on the automobile is increased as, for example, when the automobile is driven up a grade, the automobile will tend to slow down and the driver in his attempt to maintain constant speed of the automobile will depress the foot pedal, i. e. upper plate 33, to further open the throttle valve in the carburetor. Should the driver press the pedal too rapidly for efficient motor operation, as is often the case, the vacuum or suction in the intake manifold will decrease. Under these conditions gasoline will be fed to the carburetor at a rate such that the gasoline and air mixture in the carburetor will be too rich for efficient motor operation. The decrease in suction from the intake manifold will be transmitted through the tube 58 to the chamber 57 in the cylinder 46, thus permitting the piston 49 to move in a direction toward the open end 48 of the cylinder. With no pull being exerted on the cam the cam will turn from its full line position to its broken line position 41 along with movement of the upper plate 33 quickly in a direction toward the lower plate 32. The resulting release of pressure against the driver's foot will signal the driver that he is depressing the foot pedal too quickly for economical operation of the vehicle. Turning of the cam also assists in decreasing the pressure on the foot pedal against the throttle valve lever 21 thereby allowing the valve 19 to turn under pressure of its associated spring 59 toward its closed position. When suction in the intake manifold is again built up to optimum operating conditions, such vacuum will be transmitted to the cylinder 46 to pull the piston 49 inwardly of the cylinder and thereby turn the cam 40 from its broken line position to its full line position, thus returning the upper plate 33 from its broken line position 60 to its original position.

Again referring to Figures 3 and 4 of the drawing, the device 27 by which a signal is conveyed to the driver of the car, is located under the floor board 10 and not, as shown in Figure 1, directly on the foot pedal 11. This embodiment of the present invention comprises a cylinder 61 having a closure 62 at one end thereof and a cap 63 screwed on its other end.

Slidable longitudinally in the cylinder is a piston 66, the same being constituted of two metal washers 67, having a flexible disc 68 as of leather positioned between the washers. The diameter of the disc 68 is greater than the inside diameter of the cylinder whereby the marginal portion of the disc 68 is flanged over the rim of one of the washers 67 to provide a fluid type fit for the piston in the cylinder.

The piston 66 is secured to one end of the rod 26 as by a screw 71. That portion of the rod movable within the cylinder constitutes a piston rod for the piston 66 and it is movable axially in a bore 72 formed in the cap 63. The wall defining the bore 72 has an annular groove 73 therein which receives an O-ring 74. A collar 75 is located on the rod 26 within the cylinder to serve as a stop for limiting the extent of movement of the rod outwardly from the cylinder. A second collar 76 is secured on the rod externally of the cylinder and it likewise serves as a stop and limits movement of the piston rod inwardly of the cylinder.

The piston 66 and the end cap 63 define a chamber 78 within the cylinder 61. The wall of the cylinder has a nipple 79 located therein for receiving one end of the tube 28 which leads to the intake manifold 22. In the closure 62 is an aperture 80 which vents flow of air into and out from the cylinder behind the piston 66 thereby to permit movement of the piston within the cylinder in response to manifold suction. Rod 25 is secured at one end thereof to the closure plate 62 to complete the link between bell crank 17 and the throttle valve lever 21.

In operation, the device 27 serves to transmit a signal to the driver of an automobile similarly as the device 31, shown in Figures 1 and 2, that is, should the driver press down on the foot pedal 11 too heavily for efficient operation of the vehicle, the breaking of the vacuum in the intake manifold will be transmitted to the chamber 78 within the cylinder 61, thereby allowing the piston 66 to move under pressure of the operator's foot in a direction toward end closure 62. Such movement of the piston in the cylinder will substantially shorten the linkage between the bell crank and the carburetor throttle valve. This shortening of the linkage will be transmitted to the driver as a signal through his contact with the foot pedal of improper operation of the automobile. When the intake manifold suction is thereafter built up to its optimum degree, it will be transmitted to the cylinder 61 to cause the piston 66 to move in the direction of the cap 63 thereby to lengthen the linkage between the bell crank and the carburetor and return the piston to its normal position from which it may move to again absorb a too great pressure on the foot pedal.

From the above it is apparent that the invention as herein described provides an efficient device which may be manufactured simply and inexpensively and which serves to effectively transmit a signal to the driver of an automobile should he be driving his automobile improperly.

While I have herein shown and described my invention in what I have conceived to be the most practical and preferred embodiments, it is recognized that departures may be made therefrom within the scope of my invention, which is not to be limited to the details disclosed herein but is to be accorded the full scope of the claim so as to embrace any and all equivalent devices.

Having described my invention, what I claim as new and desire to secure by Letters Patent is:

A foot pedal for use in a floor board of a motor vehicle having an intake manifold, said pedal comprising a first plate adapted to be pivotally mounted with respect to the floor board, a top plate pivotally mounted to said first plate, a cam disposed between said plates, the cam being pivotally mounted to one of the said plates and having a cam surface engageable with the other of said plates, the configuration of the cam surface being such that said plates are spaced apart by a given distance when the cam is disposed in a first position and said plates are closer together when the cam is disposed in a second position, and suction actuated means operatively associated with the cam and responsive to manifold suction for pivoting the cam in a direction from said second position to said first position under suction of a first degree and for allowing movement of the cam in an opposite direction under suction of a degree less than said first degree.

References Cited in the file of this patent

UNITED STATES PATENTS

| | | |
|---|---|---|
| 1,566,376 | Couty | Dec. 22, 1925 |
| 2,264,989 | Lee | Dec. 2, 1941 |
| 2,585,814 | McDonald | Feb. 12, 1952 |
| 2,627,850 | Willim | Feb. 10, 1953 |